US012194931B2

(12) United States Patent
Izawa et al.

(10) Patent No.: US 12,194,931 B2
(45) Date of Patent: Jan. 14, 2025

(54) WIRE HARNESS

(71) Applicant: SUMITOMO WIRING SYSTEMS, LTD., Yokkaichi (JP)

(72) Inventors: Katsutoshi Izawa, Yokkaichi (JP); Kosuke Tanaka, Yokkaichi (JP); Ryuta Saito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 145 days.

(21) Appl. No.: 18/027,535

(22) PCT Filed: Aug. 3, 2021

(86) PCT No.: PCT/JP2021/028690
§ 371 (c)(1),
(2) Date: Mar. 21, 2023

(87) PCT Pub. No.: WO2022/074915
PCT Pub. Date: Apr. 14, 2022

(65) Prior Publication Data
US 2023/0373410 A1 Nov. 23, 2023

(30) Foreign Application Priority Data
Oct. 5, 2020 (JP) ................................ 2020-168193

(51) Int. Cl.
*B60R 16/02* (2006.01)
*H01B 7/40* (2006.01)
(Continued)

(52) U.S. Cl.
CPC ........... *B60R 16/0215* (2013.01); *H01B 7/40* (2013.01); *H02G 3/04* (2013.01); *H02G 3/32* (2013.01); *H01B 7/0045* (2013.01)

(58) Field of Classification Search
CPC .. H02G 3/04; H02G 3/30; H02G 3/32; H02G 3/40; H02G 3/0418; H02G 3/0462;
(Continued)

(56) References Cited

U.S. PATENT DOCUMENTS 7,740,211 B2 * 6/2010 Dukes .................... H02G 1/08
248/74.1
2019/0089142 A1 3/2019 Sugino
(Continued)

FOREIGN PATENT DOCUMENTS

JP H06-084726 U 12/1994
JP H1182813 * 3/1999 ............ F16L 3/1075
(Continued)

OTHER PUBLICATIONS

Oct. 19, 2021 International Search Report issued in International Patent Application No. PCT/JP2021/028690.

*Primary Examiner* — Paresh Paghadal
(74) *Attorney, Agent, or Firm* — Oliff PLC

(57) ABSTRACT

A wire harness to be attached to a vehicle body, the wire harness including: a wire harness main body having an electrical wire and an exterior tube covering the electrical wire; a first path restrictor attached to an outer periphery of the exterior tube and restricting a path of a straight part which is a portion of a path of the wire harness main body that is straight; a second path restrictor attached to the outer periphery of the exterior tube and restricting a path of a bent part which is a portion of the path of the wire harness main body that bends; and a connector having an annular shape surrounding the outer periphery of the exterior tube and an outer periphery of the second path restrictor, and connecting the exterior tube and the second path restrictor to each other.

12 Claims, 9 Drawing Sheets

(51) Int. Cl.
    *H02G 3/04*           (2006.01)
    *H02G 3/32*           (2006.01)
    *H01B 7/00*           (2006.01)

(58) Field of Classification Search
    CPC .............. H02G 3/0481; B60R 16/0207; B60R 16/0215; H01B 7/0045
    USPC ............................... 248/68.1, 73, 74.1–74.4
    See application file for complete search history.

(56)                   References Cited

U.S. PATENT DOCUMENTS

| | | |
|---|---|---|
| 2020/0203938 A1 | 6/2020 | Yanazawa et al. |
| 2020/0274343 A1 | 8/2020 | Sugino |

FOREIGN PATENT DOCUMENTS

| | | |
|---|---|---|
| JP | 2019-053894 A | 4/2019 |
| JP | 2020-102974 A | 7/2020 |

\* cited by examiner

WIRE HARNESS

BACKGROUND

The present disclosure relates to a wire harness.

JP 2019-53894A, for example, discloses a wire harness for a vehicle. This wire harness includes a wire harness main body having electrical wires and an exterior member that covers the electrical wires, and a path restricting member that is attached to an outer periphery of the exterior member and restricts the path of the wire harness main body. The path restricting member is constituted to include both a straight restricting part that restricts portions of the path of the wire harness main body that are straight and a bend restricting part that restricts portions of the path of the wire harness main body that bend.

SUMMARY

With a wire harness such as described above, it is desirable to configure the position of the straight restricting part of the path restricting member to be adjustable with respect to the bend restricting part.

An exemplary aspect of the disclosure provides a wire harness in which the position of a straight restricting part is adjustable with respect to a bend restricting part.

A wire harness of the present disclosure is a wire harness to be attached to a vehicle body, including a wire harness main body having an electrical wire and an exterior tube covering the electrical wire; a first path restrictor attached to an outer periphery of the exterior tube and restricting a path of a straight part which is a portion of a path of the wire harness main body that is straight; a second path restrictor attached to the outer periphery of the exterior tube and restricting a path of a bent part which is a portion of the path of the wire harness main body that bends; and a connector having an annular shape surrounding the outer periphery of the exterior tube and an outer periphery of the second path restrictor, and connecting the exterior tube and the second path restrictor to each other, wherein: the second path restrictor has a first engaging part which is a raised part protruding along a radial direction of the exterior tube or a recessed part recessed along the radial direction of the exterior tube, the connector has a second engaging part engagingly fitting together with the first engaging part, the first path restrictor has an insertion opening which is an opening along a lengthwise direction of the first path restrictor and extending over an entire length of the first path restrictor, and the first path restrictor is provided to be aligned with the second path restrictor in a lengthwise direction of the wire harness main body.

According to the present disclosure, it is possible to provide a wire harness in which the position of a straight restricting part is adjustable with respect to a bend restricting part.

DETAILED DESCRIPTION OF EMBODIMENTS

Description of Embodiments of Disclosure

Figure 1:
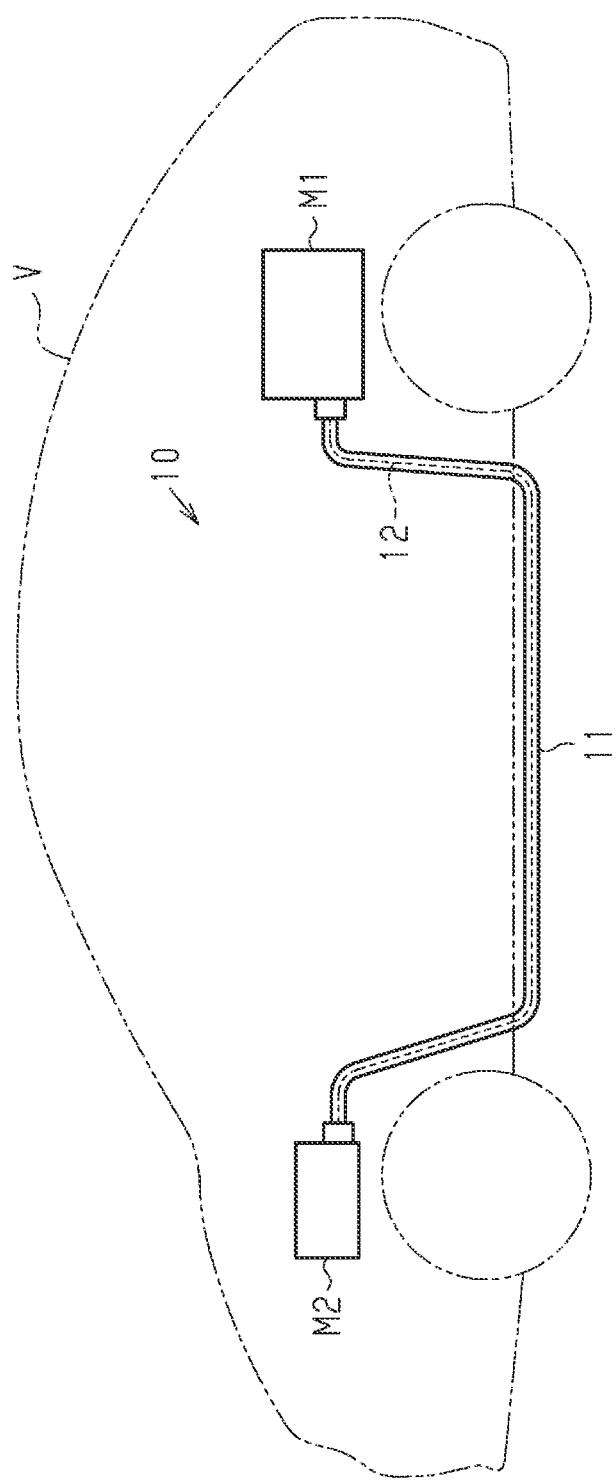
FIG. 1 is a schematic configuration diagram showing a wire harness of an embodiment.

Initially, modes of the present disclosure will be enumerated and described.

A wire harness of the present disclosure is:

[1] A wire harness to be attached to a vehicle body, including a wire harness main body having an electrical wire and an exterior member covering the electrical wire, a first path restricting member attached to an outer periphery of the exterior member and restricting a path of a straight part which is a portion of a path of the wire harness main body that is straight, a second path restricting member attached to the outer periphery of the exterior member and restricting a path of a bent part which is a portion of the path of the wire harness main body that bends, and a connecting member having an annular shape surrounding the outer periphery of the exterior member and an outer periphery of the second path restricting member, and connecting the exterior member and the second path restricting member to each other. The second path restricting member has a first engaging part which is a raised part protruding along a radial direction of the exterior member or a recessed part recessed along the radial direction of the exterior member, the connecting member has a second engaging part engagingly fitting together with the first engaging part, the first path restricting member has an insertion opening which is an opening along a lengthwise direction of the first path restricting member and extending over an entire length of the first path restricting member, and the first path restricting member is provided to be aligned with the second path restricting member in a lengthwise direction of the wire harness main body.

According to this configuration, the wire harness includes the first path restricting member that restricts a straight part of the path of the wire harness main body and the second path restricting member that restricts a bent part of the path of the wire harness main body. The first path restricting member is provided to be aligned with the second path restricting member in the lengthwise direction of the wire harness main body. The position of the first path restricting member with respect to the second path restricting member is thus adjustable.

Also, according to this configuration, the second path restricting member has the first engaging part which is a raised part that protrudes along the radial direction of the exterior member or a recessed part that is recessed along the radial direction of the exterior member. The connecting member has the second engaging part that engagingly fits together with the first engaging part. It is thereby possible to firmly connect the connecting member to the second path restricting member.

Also, according to this configuration, the insertion opening of the first path restricting member is an opening extending in the lengthwise direction of the first path restricting member, and extends over the entire length of the first path restricting member. It is thereby possible to attach the first path restricting member to the exterior member through the insertion opening, after performing terminal processing such as attaching a connector to a lengthwise end portion of the electrical wire. In this way, the first path restricting member is subsequently attachable, thus enabling the assembly workability of the wire harness to be improved.

[2] The connecting member is provided so as to straddle between the first path restricting member and the second path restricting member in the lengthwise direction of the wire harness main body, and the connecting member surrounds an outer periphery of part of the first path restricting member in the lengthwise direction thereof. According to this configuration, the gap between the first path restricting member and the second path restricting member that are attached to the outer periphery of the exterior member can be covered by the connecting member.

[3] The connecting member has a protruding part protruding toward the insertion opening and positioned within the insertion opening.

According to this configuration, the protruding part of the connecting member can be constituted to be contactable with the insertion opening of the first path restricting member in the circumferential direction of the first path restricting member. The protruding part of the connecting member thereby restricts rotation of the first path restricting member in the circumferential direction thereof, thus enabling the first path restricting member to be kept from rotating in the circumferential direction thereof.

[4] The connecting member has a main body part and a lid part that is connected to the main body part, and the connecting member has an annular shape surrounding the outer periphery of the exterior member and the outer periphery of the second path restricting member, in a state where the main body part and the lid part are connected.

According to this configuration, it is possible to subsequently attach the connecting member to the exterior member and the second path restricting member, due to the connecting member being divided into the main body part and the lid part, while constituting the connecting member to be annular. The assembly workability of the wire harness can thereby be even further improved. [5] The vehicle body has an assembly surface to which the wire harness main body is to be assembled, the lid part is disposed so as to be closer to the assembly surface than is the main body part, and the protruding part is provided in the lid part.

According to this configuration, in the connecting member, the protruding part that is positioned within the insertion opening of the first path restricting member is provided on the lid part which is closer to the assembly surface of the vehicle body. Also, in the first path restricting member, the position of the insertion opening in the circumferential direction is determined by the protruding part of the connecting member. That is, according to this configuration, the insertion opening of the first path restricting member can be constituted so as to face toward the lid part of the connecting member, that is, toward the assembly surface of the vehicle body. Accordingly, the insertion opening of the first path restricting member can be kept from facing the opposite side to the assembly surface of the vehicle body.

[6] The exterior member is a bellows-shaped corrugated tube in which a recessed part and a raised part are alternately continuous in the lengthwise direction of the exterior member, and, with the protruding part as a first protruding part, the connecting member has a second protruding part protruding from the first protruding part, and the second protruding part is fitted into the recessed part of the corrugated tube.

According to this configuration, the second protruding part of the connecting member engages the recessed part of the corrugated tube in the lengthwise direction of the corrugated tube. The corrugated tube can thereby be kept from moving in the lengthwise direction relative to the connecting member. Also, in other words, the connecting member is positioned with respect to the corrugated tube in the lengthwise direction thereof. Accordingly, it is possible to adjust the position of the first path restricting member with respect to the second path restricting member, during the assembly work of the wire harness, in a state where the position of the connecting member with respect to the corrugated tube is fixed.

[7] The exterior member is a bellows-shaped corrugated tube in which a recessed part and a raised part are alternately continuous in the lengthwise direction of the exterior member, the first engaging part is a through hole formed along the radial direction of the exterior member, the second engaging part is a third protruding part fitting into the through hole, the connecting member is a fourth protruding part protruding from the third protruding part, and the fourth protruding part is fitted into the recessed part of the corrugated tube.

According to this configuration, the fourth protruding part of the connecting member engages the recessed part of the corrugated tube in the lengthwise direction of the corrugated tube. The corrugated tube can thereby be kept from moving in the lengthwise direction relative to the connecting member. Also, in other words, the connecting member is positioned with respect to the corrugated tube in the lengthwise direction thereof. Accordingly, it is possible to adjust the position of the first path restricting member with respect to the second path restricting member, during the assembly work of the wire harness, in a state where the position of the connecting member with respect to the corrugated tube is fixed.

[8] A plurality of the first engaging part are provided in a circumferential direction of the second path restricting member.

According to this configuration, which of the plurality of first engaging parts provided in the circumferential direction of the second path restricting member is to be fitted together with the second engaging part of the connecting member is selectable according to the path of the bent part of the wire harness main body. Thus, the degree of freedom in the layout of the wire harness can be improved.

[9] With the insertion opening of the first path restricting member as a first insertion opening, the second path restricting member has a second insertion opening which is an opening along a lengthwise direction of the second path restricting member and extending over an entire length of the second path restricting member.

According to this configuration, the second insertion opening is an opening extending in the lengthwise direction of the second path restricting member, and extends over the entire length of the second path restricting member. It is thereby possible to attach the second path restricting member to the exterior member through the second insertion opening, after performing terminal processing such as attaching a connector to a lengthwise end portion of the electrical wire. In this way, the second path restricting member is subsequently attachable, and it is thus possible to further improve the assembly workability of the wire harness.

[10] The first path restricting member is provided for each of a pair of the straight part provided one on either side of the bent part on the path of the wire harness main body, and the connecting member is provided at both end portions of the second path restricting member in the lengthwise direction of the wire harness main body.

According to this configuration, the first path restricting members disposed on either side of the second path restricting member in the lengthwise direction of the wire harness main body are provided to be aligned with the second path restricting member in the lengthwise direction of the wire harness main body. The position of the first path restricting members with respect to the second path restricting member is thus adjustable.

[11] The first path restricting member has a first end portion and a second end portion which are both end portions in a circumferential direction of the first path restricting member and form the insertion opening, and a contact part protruding from an inner surface of at least one of the first end portion and the second end portion and contacting an outer surface of the exterior member.

According to this configuration, the first path restricting member has the contact part that protrudes from the inner surface of at least one of the first end portion and the second end portion and contacts the outer surface of the exterior member. Thus, the first path restricting member can be suitably kept from detaching from the exterior member through the insertion opening.

[12] The contact part protrudes from an inner surface of a distal end of at least one of the first end portion and the second end portion.

According to this configuration, the path restricting member can be even more reliably kept from detaching from the exterior member through the insertion opening, compared to the case where, for example, the contact part protrudes from the inner surface at a position slightly away from the distal end of the first end portion or the distal end of the second end portion.

DETAILED DESCRIPTION OF EMBODIMENTS OF DISCLOSURE

Specific examples of a wire harness of the present disclosure will be described below with reference to the drawings. In the individual diagrams, some of the configurations may be shown in an exaggerated manner or a simplified manner, for convenience of description. Also, the dimensional ratios of various portions may differ in the individual diagrams. Also, "orthogonal" herein is not only strictly orthogonal but also includes generally orthogonal within a range that achieves the operation and effect of the present embodiment. Note that the present disclosure is not limited to these illustrative examples and is defined by the claims, and all changes that come within the meaning and range of equivalency of the claims are intended to be embraced therein.

Note that "tubular" as used in the description herein includes not only that in which the peripheral wall is formed continuously around the entire periphery in the circumferential direction, but also that in which a plurality of components are combined to form a tubular shape, or that which is partially cut away in the circumferential direction such as a C-shape. Also, a "tubular" shape includes a circular shape, an elliptical shape, and a polygonal shape with pointed or rounded corners. Also, the term "annular" as used in the description herein may refer to any structure that forms a loop, a continuous shape without end portions, and a generally loop-shaped structure having a gap such as a C-shape. Note that an "annular" shape includes, but is not limited to, a circular shape, an elliptical shape, and a polygonal shape with pointed or rounded corners.

Overall Configuration of Wire Harness 10

A wire harness 10 shown in FIG. 1 connects devices provided in a vehicle V, for example. The wire harness 10 is disposed in the vehicle V such that a lengthwise intermediate portion of the wire harness 10 passes outside the vehicle cabin such as under the floor of the vehicle V, for example.

The wire harness 10 includes a wire harness main body 11. The wire harness main body 11 electrically connects a first device M1 and a second device M2 that are provided in the vehicle V. As examples of the first device M1 and the second device M2, the first device M1 is a high-voltage battery disposed in a location toward the rear of the vehicle V, and the second device M2 is an inverter disposed in a location toward the front of the vehicle V. The first device M1 which is a high-voltage battery is, for example, a battery capable of supplying a voltage of 100 volts or more. The second device M2 which is an inverter is connected to a motor (not shown) for driving wheels and serves as a power source for vehicle travel. The inverter generates AC power from the DC power of the high-voltage battery and supplies that AC power to the motor. The wire harness main body 11 is wired along a path that bends two-dimensionally or three-dimensionally.

Configuration of Wire Harness Body 11

Figure 5:
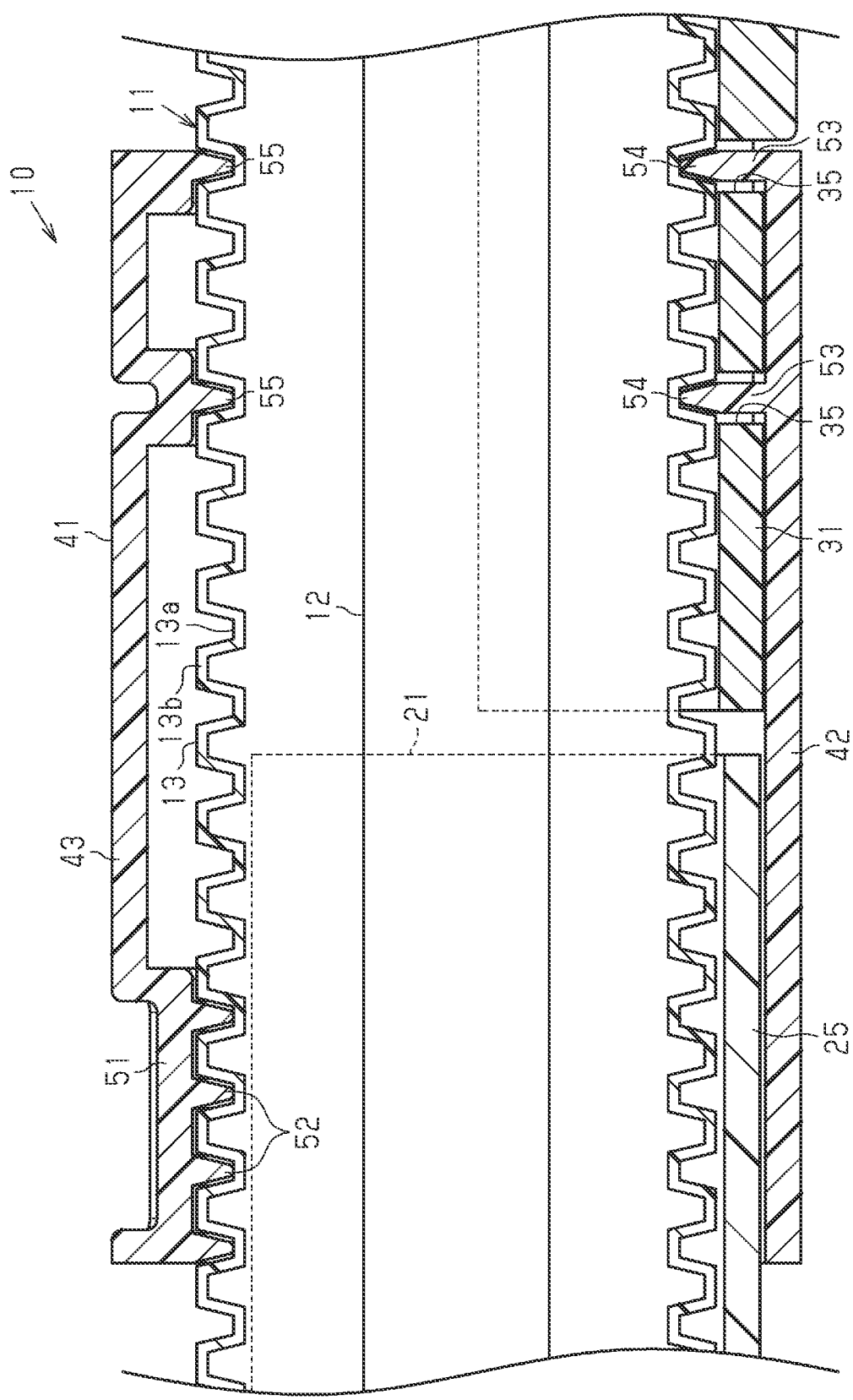
FIG. 5 is a cross-sectional view taken along line 5-5 in FIG. 4.
Figure 6:
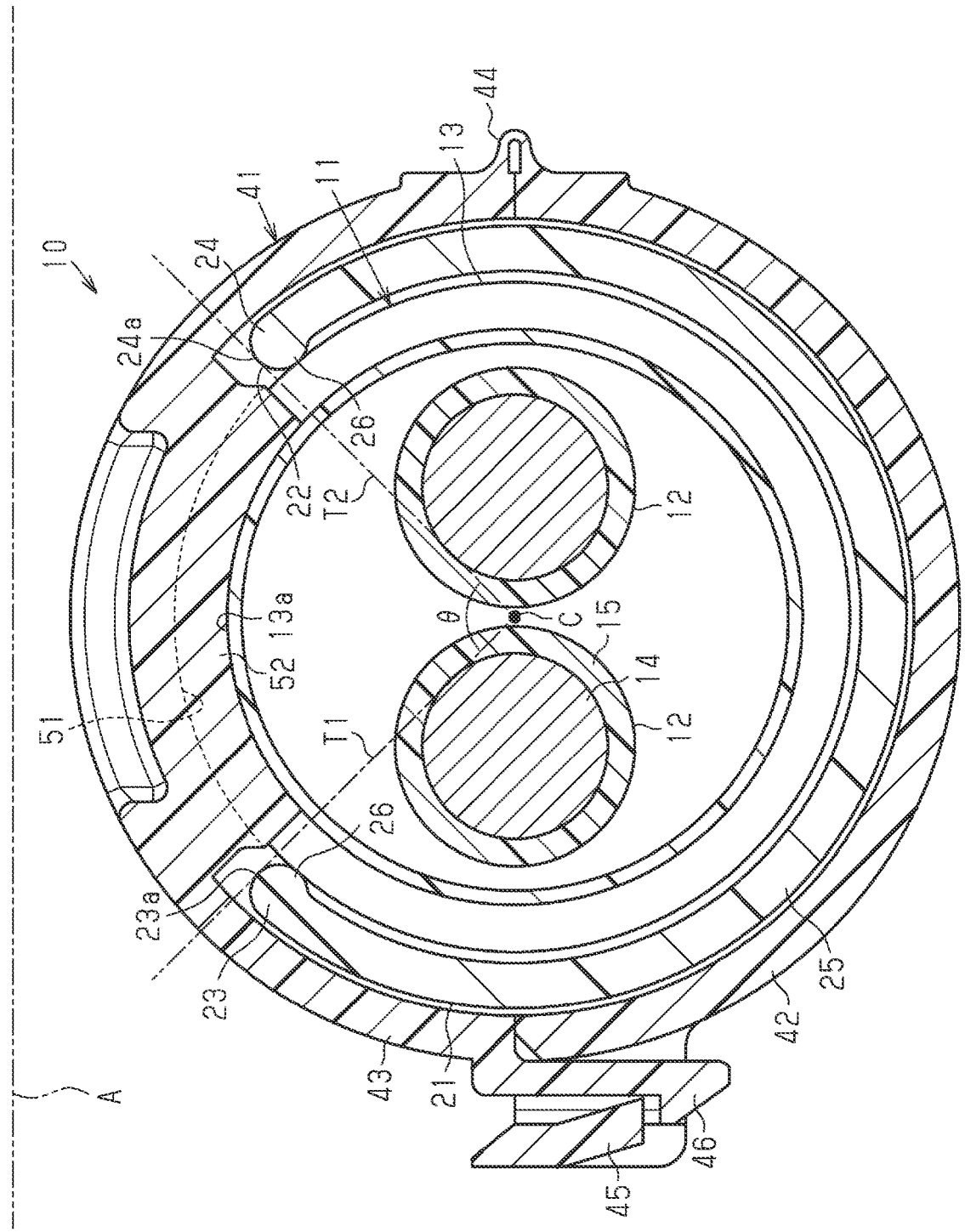
FIG. 6 is a cross-sectional view taken along line 6-6 in FIG. 4.

As shown in FIGS. 5 and 6, the wire harness main body 11 has an electrical wire 12 and an exterior member 13 (exterior tube). A plurality of electrical wires 12 are provided, for example.

As shown in FIG. 6, the wires 12 are coated wires, for example. That is, the wires 12 each have a core wire 14 and an insulating coating 15 that covers the outer periphery of the core wire 14. The core wire 14 is constituted by a flexible conductor capable of being easily bent, for example. Note that a twisted wire obtained by twisting a plurality of metal strands together is given as an example of the flexible conductor. As the material of the core wire 14, a metal material such as a copper-based or aluminum-based metal material, for example, can be used.

The insulating coating 15 covers the outer peripheral surface of the core wire 14 around the entire circumference, for example. The insulating coating 15 is constituted by an insulating material such as a synthetic resin, for example. The insulating coating 15 can be formed by performing extrusion molding on the core wire 14, for example.

As shown in FIGS. 5 and 6, the exterior member 13 has a long tubular shape as a whole. The plurality of wires 12 are inserted into the inner space of the exterior member 13. That is, the exterior member 13 collectively encloses the outer periphery of the plurality of wires 12. The exterior member 13 protects the wires 12 from projectiles and water droplets, for example. The wires 12 are connected at one end to the first device M1, and the other ends of the wires 12 are connected to the second device M2. The wires 12 are high-voltage electrical wires capable of handling high voltages and large currents.

The exterior member 13 is constituted by a corrugated tube made of synthetic resin, for example. The exterior member 13 which is a corrugated tube has a bellows shape constituted by alternating large and small diameter portions in the lengthwise direction thereof. That is, the exterior member 13 has a recessed part 13a and a raised part 13b that are alternately continuous in the lengthwise direction of the exterior member 13. The recessed parts 13a and raised parts 13b each have an annular shape completely around in the circumferential direction of the exterior member 13, for example. The exterior member 13 made of corrugated tube is flexible and easily bendable. Note that a synthetic resin such as polyolefin, polyamide, polyester or ABS resin, for example, can be used as the constituent material of the exterior member 13.

Figure 2:
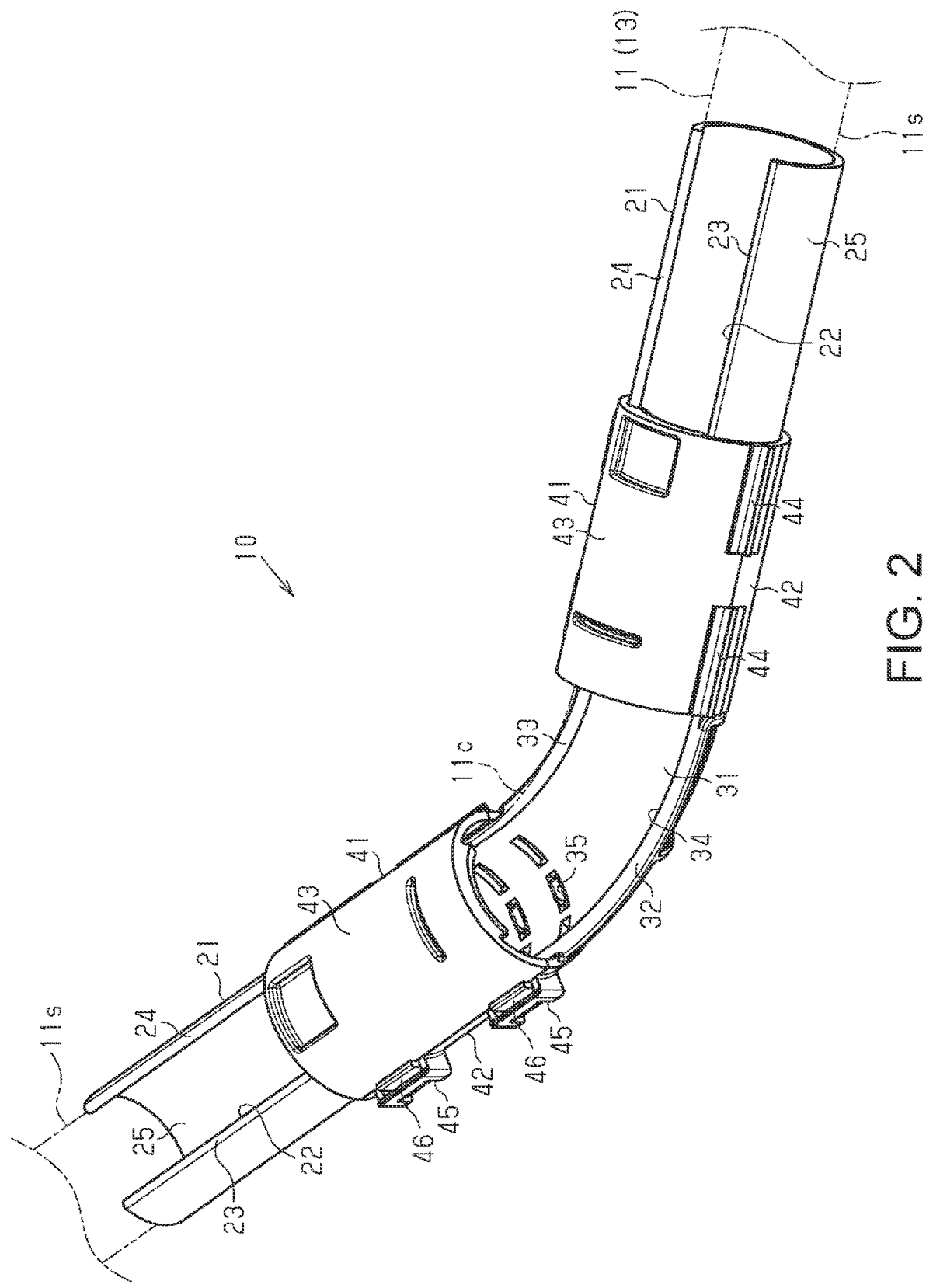
FIG. 2 is a perspective view showing part of the wire harness of the embodiment.

As shown in FIG. 2, the wire harness 10 includes a pair of first path restricting members 21 (first path restrictors), a second path restricting member (second path restrictor) 31, and a pair of connecting members 41 (connectors). Note that, in FIG. 1, illustration of the first path restricting members 21, the second path restricting member 31, and the connecting members 41 is omitted.

The first path restricting members 21 and the second path restricting member 31 are attached to the outer periphery of the exterior member 13. Specifically, the first path restricting members 21 are attached to the outer periphery of the exterior member 13 in a straight part 11s, which is a portion of the path of the wire harness main body 11 that is straight. The first path restricting members 21 restrict the path of the wire harness main body 11 in the straight part 11s.

The second path restricting member 31 is attached to the outer periphery of the exterior member 13 in a bent part 11c, which is a portion of the path of the wire harness main body 11 that bends. The second path restricting member 31 restricts the path of the wire harness main body 11 in the bent part 11c. The first path restricting members 21 are respectively provided for a pair of straight parts 11s provided one on either side of the bent part 11c in the path of the wire harness main body 11, for example. The first path restricting members 21 and the second path restricting member 31 support the exterior member 13 such that the wire harness main body 11 does not deviate from a predetermined path due to bending under its own weight or the like.

Configuration of First Path Restricting Member 21

As shown in FIG. 6, the first path restricting member 21 covers part of the outer peripheral surface of the exterior member 13 in the circumferential direction. For example, the first path restricting member 21 covers a range spanning more than 180 degrees of the outer periphery of the exterior member 13. Also, the first path restricting member 21 extends along the lengthwise direction of the exterior member 13.

The first path restricting member 21 has a first insertion opening 22 which is an opening that extends in the lengthwise direction of the first path restricting member 21. Also, the first path restricting member 21 has a first end portion 23 and a second end portion 24 which are both end portions in the circumferential direction of the first path restricting member 21 and form the first insertion opening 22. Also, the first path restricting member 21 has an intermediate portion 25 which is a region that joins the first end portion 23 and the second end portion 24. In other words, the first path restricting member 21 includes the intermediate portion 25 formed so as to cover part of the exterior member 13 in the circumferential direction, the first end portion 23 and the second end portion 24 provided at either end of the intermediate portion 25, and the first insertion opening 22 that is formed by the first end portion 23 and the second end portion 24.

The first end portion 23 and the second end portion 24 oppose each other at a distance in the circumferential direction of the first path restricting member 21. The space between the first end portion 23 and the second end portion 24 is constituted as the first insertion opening 22.

The first insertion opening 22 is an opening along the lengthwise direction of the first path restricting member 21, and extends over the entire length of the first path restricting member 21. The opening width of the first insertion opening 22, that is, the shortest distance between the first end portion 23 and the second end portion 24, is smaller than the outer diameter of the exterior member 13. In the first insertion opening 22, the exterior member 13 is inserted along a direction orthogonal to the lengthwise direction of the first path restricting member 21.

The intermediate portion 25 constitutes a main portion of the first path restricting member 21. The cross-sectional shape of the intermediate portion 25 is a circular arc shape, for example. Note that the radial thickness of the intermediate portion 25 is uniform in the circumferential direction, for example. Note that the cross-sectional shape of the first path restricting member 21 is uniform over the entire length of the first path restricting member 21, for example. Also, a center axis C in the cross section of the intermediate portion 25 is a straight line, for example. That is, the first path restricting member 21 has a shape extending linearly in one direction.

In the cross section of the first path restricting member 21, a tangent of the first end portion 23 that passes through the center axis C of the intermediate portion 25 is given as a tangent T1, and a tangent of the second end portion 24 that passes through the center axis C is given as a tangent T2. An opening angle θ of the first insertion opening 22 in the circumferential direction of the first path restricting member 21 is within a range of 60 degrees to 120 degrees, for example. Note that the opening angle θ of the first insertion opening 22 is an angle centered on the center axis C of the intermediate portion 25, that is, an angle that is formed by the tangent T1 and the tangent T2.

The first path restricting member 21 has a contact part 26 that protrudes from the inner surface of both the first end portion 23 and the second end portion 24. The cross-sectional shape of each contact part 26 is a semicircular shape, for example. The contact parts 26 extend along the lengthwise direction of the first path restricting member 21, for example. Also, the contact parts 26 extend over the entire length of the first path restricting member 21 in the lengthwise direction thereof, for example.

The contact parts 26 protrude toward the exterior member 13. The contact parts 26 contact the outer surface of the exterior member 13. Also, the contact parts 26 press the exterior member 13, for example. The exterior member 13 is elastically sandwiched by the contact parts 26 and the intermediate portion 25. The connection of the first path restricting member 21 to the exterior member 13 will thereby be strong. Accordingly, the first path restricting member 21 attached to the outer periphery of the exterior member 13 is kept from moving in the lengthwise direction of the exterior member 13.

Note that, in the state where the exterior member 13 is inserted inside the first path restricting member 21, the opening width of the first insertion opening 22 does not necessarily return to its original width, that is, the width when the exterior member 13 is not inserted inside the first path restricting member 21. Specifically, the opening width of the first insertion opening 22 may be slightly larger than its original width, due to the elastic deformation that causes the first path restricting member 21 to return to its original shape being impeded by the exterior member 13. Also, in the state where the exterior member 13 is inserted inside the first path restricting member 21, the opening width of the first insertion opening 22 may return to its original width, due to the exterior member 13 being flexed by the pressing force of the first path restricting member 21. That is, the size of the opening width when the exterior member 13 has been inserted inside the first path restricting member 21 will be based on the rigidity, flexibility and the like of the exterior member 13 and the first path restricting member 21.

In the first path restricting member 21, a circumferential distal end 23a of the first end portion 23 and a circumferential distal end 24a of the second end portion 24 are curved, as seen from the lengthwise direction of the first path restricting member 21. In other words, the cross-sectional shape of the distal end 23a of the first end portion 23 and the distal end 24a of the second end portion 24 is a curved shape. Note that the first insertion opening 22 is formed by the distal end 23a of the first end portion 23 and the distal end 24a of the second end portion 24. Also, the contact part 26 protrudes from the inner surface of the distal end 23a of the first end portion 23 and the inner surface of the distal end 24a of the second end portion 24.

Note that, as the material of the first path restricting member 21, a synthetic resin such as polypropylene, polyamide or polyacetal, for example, can be used. The first path restricting member 21 can be molded by a known method such as extrusion molding or injection molding, for example.

Configuration of Second Path Restricting Member 31

Figure 3:
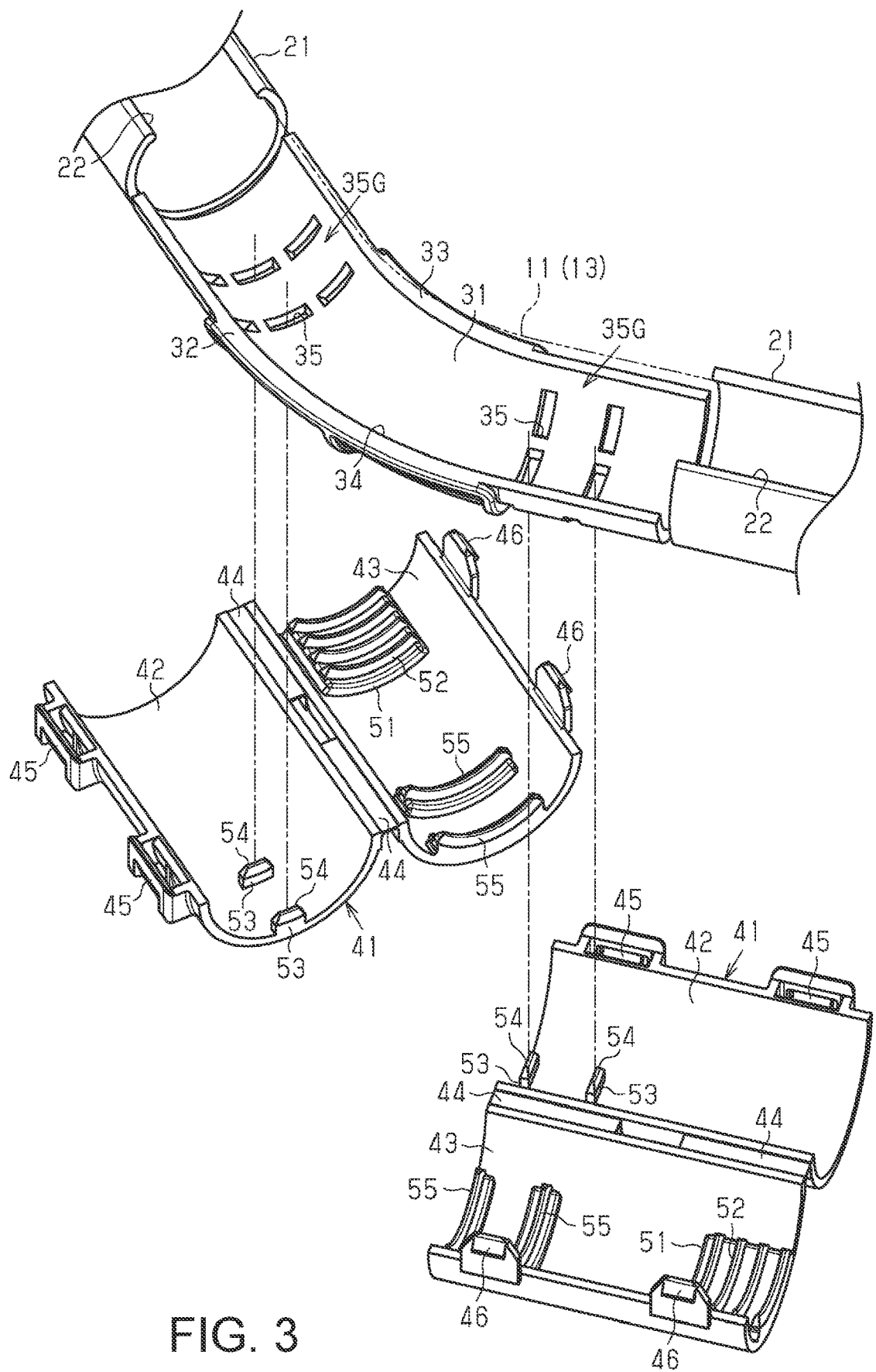
FIG. 3 is an exploded perspective view for showing a first path restricting member, a second path restricting member, and a connecting member of the embodiment.

As shown in FIG. 3, the second path restricting member 31 is attached to the exterior member 13 in the bent part 11c of the wire harness main body 11. The second path restricting member 31 bends along the shape of the bent part 11c.

Figure 7:
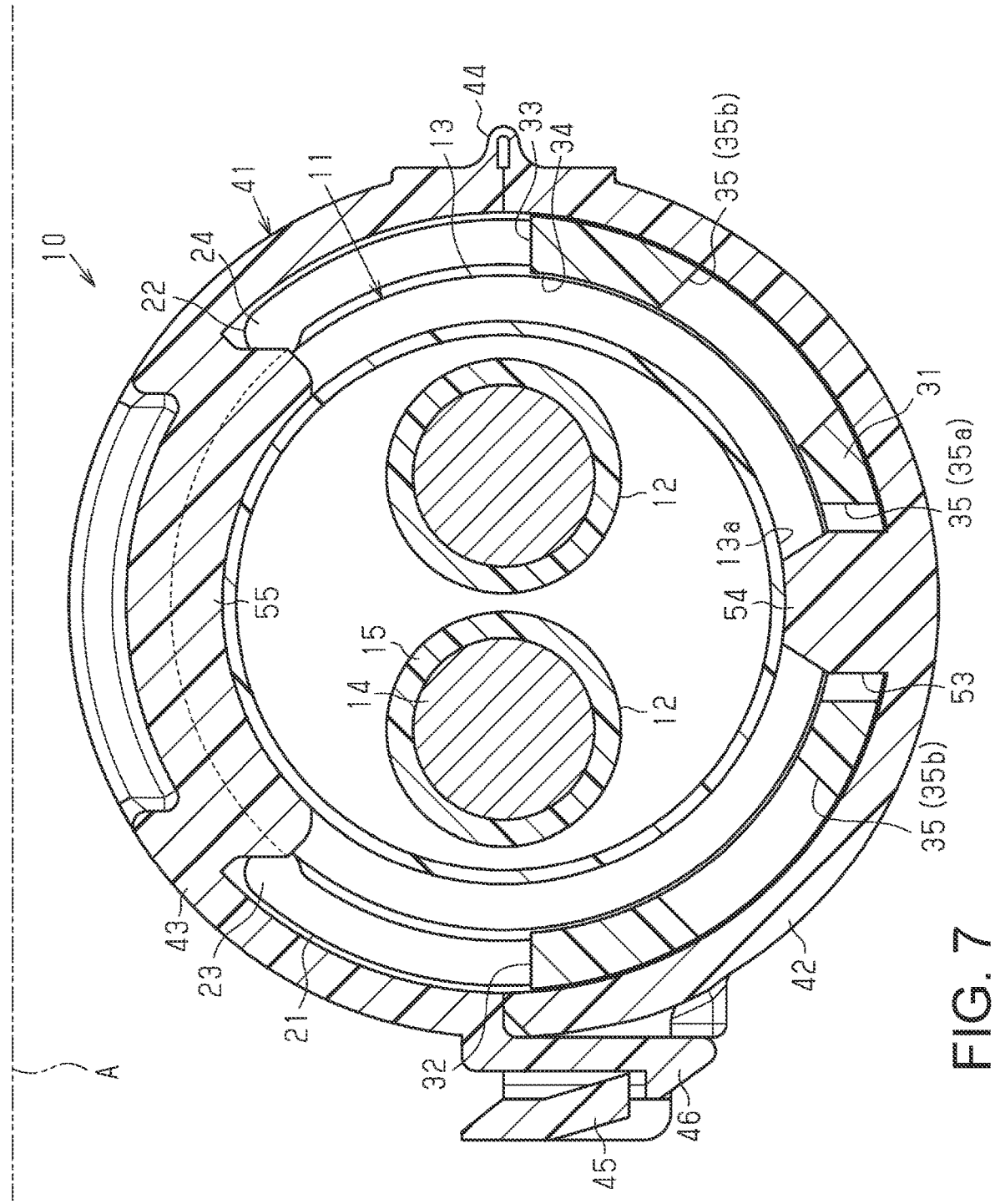
FIG. 7 is a cross-sectional view taken along line 7-7 in FIG. 4.

As shown in FIG. 7, the second path restricting member 31 covers part of the outer peripheral surface of the exterior member 13 in the circumferential direction. The second path restricting member 31 has an approximately semi-cylindrical shape, for example. That is, the second path restricting member 31 covers a range spanning roughly 180 degrees of the outer periphery of the exterior member 13. Also, the second path restricting member 31 extends along the shape of the bent part 11c of the wire harness main body 11.

Figure 4:
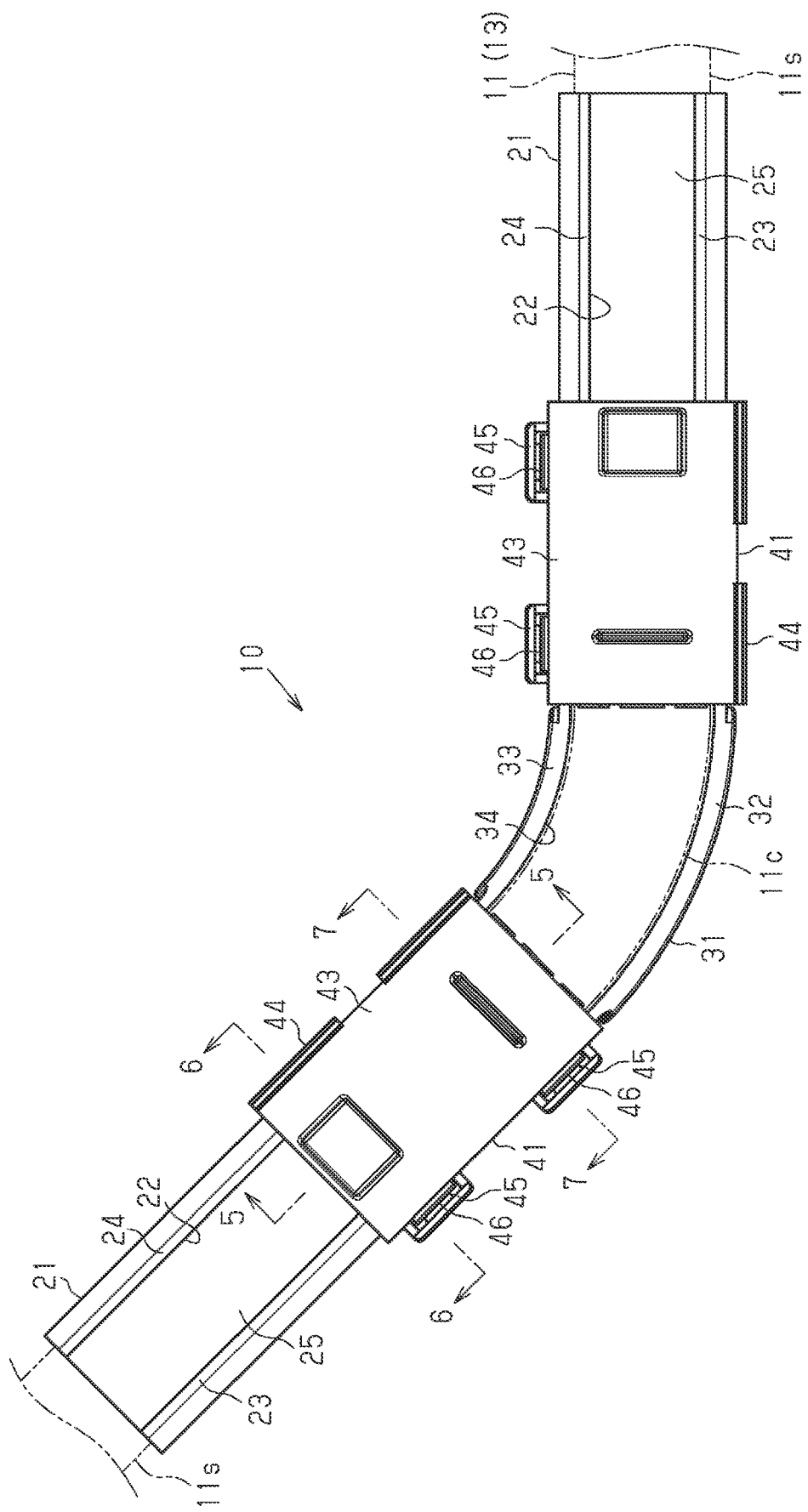
FIG. 4 is a plan view showing part of the wire harness of the embodiment.

The second path restricting member 31 has a third end portion 32 and a fourth end portion 33 which are both end portions in the circumferential direction of the second path restricting member 31. Also, the second path restricting member 31 has a second insertion opening 34 that is formed by the third end portion 32 and the fourth end portion 33. The second insertion opening 34 is the opening between the third end portion 32 and the fourth end portion 33. The second insertion opening 34 is an opening along the lengthwise direction of the second path restricting member 31. Also, the second insertion opening 34 extends over the entire length of the second path restricting member 31. As shown in FIG. 4, the third end portion 32 and the fourth end portion 33 bend along the bent part 11c of the wire harness main body 11, as seen from the opening direction of the second insertion opening 34, for example.

The opening width of the second insertion opening 34, that is, the shortest distance between the third end portion 32 and the fourth end portion 33, is equivalent to the outer diameter of the exterior member 13 or slightly larger than the outer diameter of the exterior member 13. In the second insertion opening 34, the exterior member 13 is inserted along a direction orthogonal to the lengthwise direction of the second path restricting member 31.

As shown in FIGS. 3 and 7, the second path restricting member 31 has a through hole 35 serving as a first engaging part. The through hole 35 passes through the second path restricting member 31 along the radial direction of the exterior member 13. The second path restricting member 31 has a plurality of through holes 35, for example. As shown in FIG. 3, the through holes 35 are provided in two rows along the lengthwise direction of the second path restricting member 31, and are provided in three rows along the circumferential direction of the second path restricting member 31, for example. That is, six through holes 35 are provided. Also, in the second path restricting member 31 of the present embodiment, a through hole group 35G consisting of the six through holes 35 is provided in the vicinity of both end portions in the lengthwise direction of the second path restricting member 31.

Note that, as the material of the second path restricting member 31, a synthetic resin, for example, can be used. The second path restricting member 31 can be molded by a known method such as injection molding, for example.

As shown in FIGS. 2 and 4, the first path restricting member 21 is disposed on both sides of the second path restricting member 31 in the lengthwise direction of the wire harness main body 11. The first path restricting members 21 are provided at a distance from the second path restricting member 31 in the lengthwise direction of the wire harness main body 11. The first path restricting members 21 are aligned with the second path restricting member 31 via a slight gap, for example.

Configuration of Connecting Member 41

The connecting member 41 is provided at both end portions of the second path restricting member 31 in the lengthwise direction of the wire harness main body 11. The connecting members 41 connect the exterior member 13 and the second path restricting member 31 to each other. Also, the connecting members 41 are provided so as to straddle between the end portion of the second path restricting member 31 and the end portion of the first path restricting members 21, in the lengthwise direction of the wire harness main body 11.

As shown in FIGS. 3 and 6, the connecting members 41 have a main body part 42 (main body) and a lid part 43 (lid) that is connected to the main body part 42. The main body part 42 and the lid part 43 are integrally formed with each other, for example. Note that, as the material of the connecting members 41, a synthetic resin, for example, can be used. The connecting members 41 can be molded by a known method such as injection molding, for example.

The main body part 42 has a substantially semi-cylindrical shape, for example. The main body part 42 covers approximately half of the lengthwise end portion of the second path restricting member 31 in the circumferential direction, for example. Also, the lid part 43 has an approximately semi-cylindrical shape of the same size as the main body part 42, for example. The main body part 42 and the lid part 43 cover the lengthwise end portion of the second path restricting member 31 entirely in the circumferential direction.

The connecting members 41 each have a hinge part 44 that joins the main body part 42 and the lid part 43, for example. The hinge part 44 joins one circumferential end of the main body part 42 to one circumferential end of the lid part 43. A lock part 45 is provided at the other circumferential end of the main body part 42. A claw part 46 is provided at the other circumferential end of the lid part 43.

The lid part 43 is rotatable between an open position shown in FIG. 3 and a closed position shown in FIG. 2 with the hinge part 44 as the axis. The lid part 43 covers the upper opening of the main body part 42 in the closed position. Also, when the lid part 43 is in the closed position, the claw part 46 catches on the lock part 45. The lid part 43 is thereby held in the closed position. In this way, the main body part 42 and the lid part 43 are connected to each other. When the main body part 42 and the lid part 43 are connected, the connecting members 41 have an annular shape surrounding the outer periphery of the wire harness main body 11. The connecting members 41 collectively surround the lengthwise end portions of the exterior member 13 and the second path restricting member 31. That is, the connecting members 41 connect the second path restricting member 31 to the exterior member 13, such that the second path restricting member 31 does not detach from the exterior member 13.

Also, the connecting members 41 respectively surround the outer periphery of the lengthwise end portions of the first path restricting members 21. The connecting members 41 are provided at places where the end portions of the second path restricting member 31 and end portions of the first path restricting members 21 oppose each other in the lengthwise direction of the wire harness main body 11. That is, the connecting members 41 cover the outer periphery of the gap between the first path restricting members 21 and the second path restricting member 31. Also, for example, the lid part 43 covers the first insertion opening 22 of the first path restricting members 21 in the closed state in which the lid part 43 is connected to the main body part 42.

As shown in FIGS. 3, 5 and 6, each connecting member 41 has a first protruding part 51 (first protrusion) that protrudes from the inner peripheral surface of the lid part 43. The first protruding part 51 is provided at a region of the connecting member 41 that surrounds the first path restricting member 21. The first protruding part 51 protrudes along a direction orthogonal to the lengthwise direction of the wire harness main body 11. The first protruding part 51 protrudes toward the first insertion opening 22 and is positioned within the first insertion opening 22. That is, the first protruding part 51 is contactable, in the circumferential direction of the first path restricting member 21, with the first end portion 23 and the second end portion 24 constituting the first insertion opening 22. The first protruding part 51 thereby restricts rotation of the first path restricting member 21 in the circumferential direction.

Note that, in the present embodiment, the first path restricting members 21 engage the connecting members 41 in the circumferential direction due to the first protruding part 51, but do not engage the connecting members 41 in a direction along the lengthwise direction of the wire harness main body 11. Accordingly, the position of the first path restricting members 21 in the lengthwise direction of the wire harness main body 11 is adjustable, in a state where the first path restricting members 21, the second path restricting member 31 and the connecting members 41 are attached to the wire harness main body 11. Note that after adjusting the position of the first path restricting members 21 in the lengthwise direction of the wire harness main body 11, the first path restricting members 21 are fixed to the exterior member 13 by a band-like member such as an adhesive tape or a fastening band, for example. Accordingly, when assembling the wire harness 10 to an assembly surface A of the vehicle body, the first path restricting members 21 do not shift in the lengthwise direction of the wire harness main body 11.

Each connecting member 41 has a second raised part 52 that protrudes further inward from the distal end of the first protruding part 51. The distal end of the second raised part 52 has a circular arc shape along the outer periphery of the exterior member 13, for example. A plurality of second protruding parts 52 (second protrusions) are provided, for example. The plurality of second protruding parts 52 are arranged in the lengthwise direction of the exterior member 13. The plurality of second protruding parts 52 are respectively fitted into the plurality of recessed parts 13a of the exterior member 13. The second protruding parts 52 thereby engage the recessed parts 13a in the lengthwise direction of the exterior member 13. Accordingly, the connecting members 41 and the exterior member 13 are less likely to move relatively in the lengthwise direction of the exterior member 13.

As shown in FIGS. 3, 5 and 7, each connecting member 41 has a third protruding part 53 (third protrusion) that protrudes from the inner peripheral surface of the main body part 42. The third protruding part 53 is provided in a region of the main body part 42 that covers the second path restricting member 31. The third protruding part 53 extends along a direction orthogonal to the lengthwise direction of the wire harness main body 11.

Two third protruding parts 53 are provided along the lengthwise direction of the wire harness main body 11, for example. The third protruding parts 53 are fitted into the through holes 35 provided in the second path restricting member 31. In other words, the third protruding parts 53 are second engaging parts that engagingly fit together with the through holes 35 serving as the first engaging parts. The third protruding parts 53 are contactable, in the circumferential and lengthwise directions of the second path restricting member 31, with the through holes 35 into which they are fitted. That is, due to the third protruding parts 53 being fitted into the through holes 35, the second path restricting member 31 and the connecting members 41 cannot move relatively in the circumferential and lengthwise directions of the second path restricting member 31.

Each connecting member 41 has fourth protruding parts 54 (fourth protrusion) that protrude further inward from the distal end of the third protruding parts 53. The distal end of the fourth protruding parts 54 has a circular arc shape along the outer periphery of the exterior member 13, for example. The fourth protruding parts 54 provided on the third protruding parts 53 are arranged in the lengthwise direction of the exterior member 13. The fourth protruding parts 54 are fitted into the recessed parts 13a of the exterior member 13. The fourth protruding parts 54 thereby engage the recessed parts 13a in the lengthwise direction of the exterior member 13. Accordingly, the connecting members 41 and the exterior member 13 are even less likely to move relatively in the lengthwise direction of the exterior member 13.

Each connecting member 41 has a fifth protruding part 55 that protrudes from the inner peripheral surface of the lid part 43. The fifth protruding part 55 is provided in a region of the connecting member 41 that surrounds the second path restricting member 31. The fifth protruding part 55 protrudes along a direction orthogonal to the lengthwise direction of the wire harness main body 11. A plurality of fifth protruding parts 55 are provided, for example. The plurality of fifth protruding parts 55 are arranged in the lengthwise direction of the exterior member 13. The distal end of each fifth protruding part 55 has a circular arc shape along the outer periphery of the exterior member 13, for example. The distal ends of the fifth protruding parts 55 are respectively fitted into the recessed parts 13a of the exterior member 13. The fifth protruding parts 55 thereby engage the recessed parts 13a in the lengthwise direction of the exterior member 13. Accordingly, the connecting members 41 and the exterior member 13 are even less likely to move relatively in the lengthwise direction of the exterior member 13.

Operation of the present embodiment will now be described.

In the straight part 11s of the path of the wire harness main body 11 to which the first path restricting members 21 are attached, the rigidity of the first path restricting members 21 keeps the wire harness main body 11 from bending under its own weight or the like. Also, in the bent part 11c to which the second path restricting member 31 is attached, the rigidity of the second path restricting member 31 keeps the wire harness main body 11 from bending under its own weight or the like.

As shown in FIG. 6, the wire harness 10 is disposed along the assembly surface A of the vehicle body. The wire harness 10 is then fixed to the assembly surface A by a fixing member (not shown). Note that the point on the path of the wire harness 10 at which the wire harness 10 is fixed to the assembly surface A by the fixing member is set to at least one of the first path restricting members 21, the second path restricting member 31, and a place of the exterior member 13 where the first path restricting members 21 and the second path restricting member 31 are not provided, for example.

When the wire harness 10 has been assembled to the assembly surface A, the lid part 43 of the connecting members 41 is located closer to the assembly surface A than is the main body part 42. When the vehicle V is on the ground and the assembly surface A is under the floor of the vehicle V, the assembly surface A faces the ground. Accordingly, the main body part 42 of the connecting members 41 is located more on the ground side than is the lid part 43.

Here, in the first path restricting members 21, the position of the first insertion opening 22 in the circumferential direction is determined by the first protruding part 51 of the lid part 43. Accordingly, the first insertion opening 22 is constituted so as to face the lid part 43 side, that is, the assembly surface A side. That is, the first path restricting members 21 cover the ground side of the exterior member 13. The first path restricting members 21 are thereby able to suitably protect the exterior member 13 from projectiles and water droplets, for example. The first path restricting members 21 are thereby able to contribute to improving the durability of the wire harness main body 11.

Also, as shown in FIG. 7, the second path restricting member 31 is provided so as to overlap the main body part 42. That is, when the wire harness 10 has been assembled to the assembly surface A, the second path restricting member 31 covers the ground side of the exterior member 13. The second path restricting member 31 is thereby able to suitably protect the exterior member 13 from projectiles and water droplets, for example. The second path restricting member 31 is thereby able to contribute to improving the durability of the wire harness main body 11.

In the present embodiment, the orientation of the connecting members 41 in the circumferential direction of the wire harness main body 11 is changeable. To elaborate, the orientation of the connecting members 41 in the circumferential direction changes, depending on which of the plurality of through holes 35 aligned in the circumferential direction of the second path restricting member 31 the third protruding parts 53 of the connecting members 41 are fitted into. Furthermore, when the connecting members 41 change in orientation in the circumferential direction, the first path restricting members 21 positioned by the first protruding part 51 of the connecting members 41 also change in orientation in the circumferential direction.

As shown in FIG. 7, out of the three through holes 35 aligned in the circumferential direction, the middle through hole will be denoted as through hole 35a, and the through holes on either side of the through hole 35a will be denoted as through holes 35b.

In the state shown in FIGS. 4 and 7, the third protruding parts 53 are fitted into the through holes 35a. In this state, the opening direction of the first insertion opening 22 of the first path restricting members 21 has the same orientation as the opening direction of the second insertion opening 34 of the second path restricting member 31.

Figure 8:
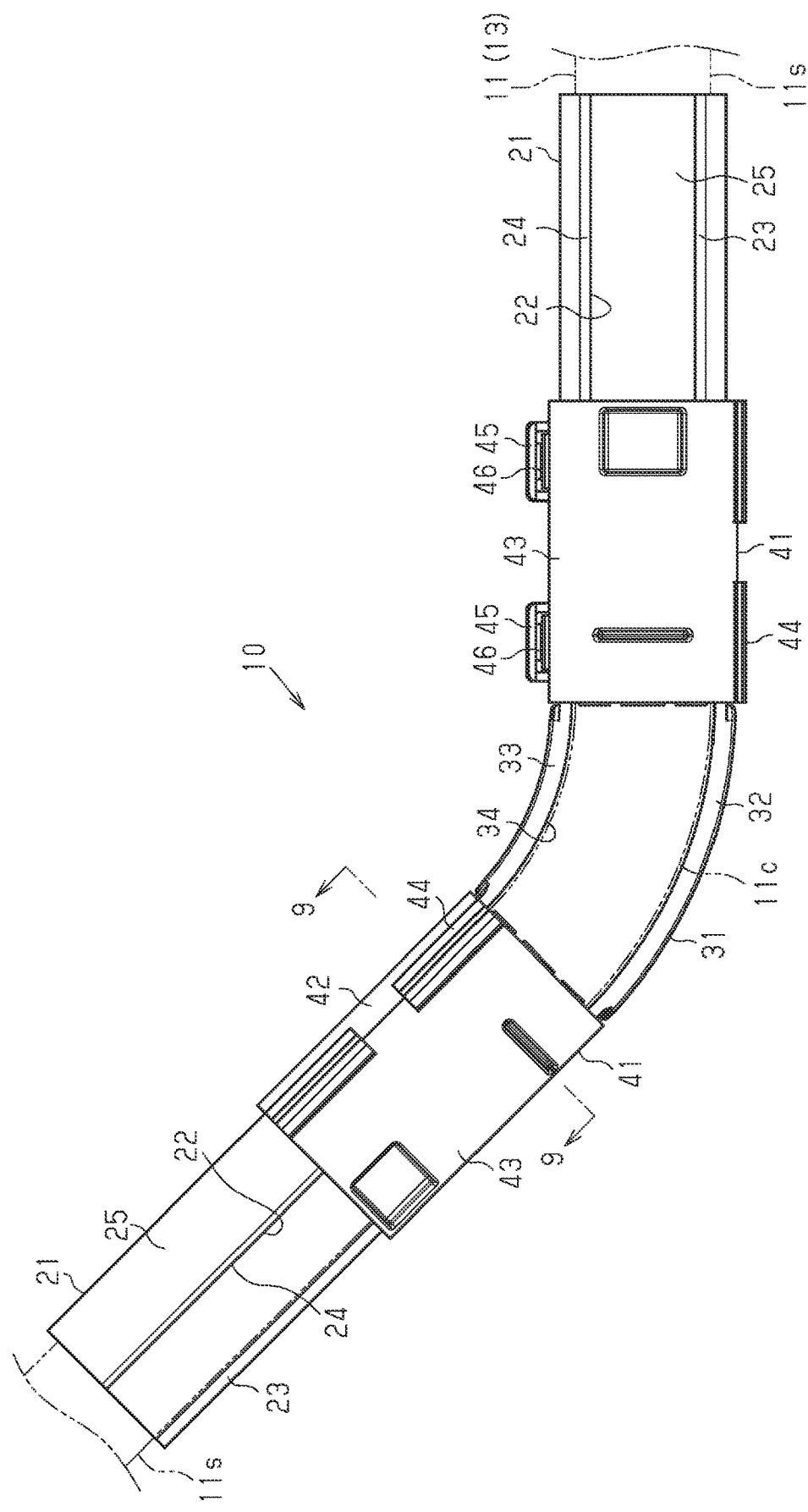
FIG. 8 is a plan view for describing operation of the wire harness of the embodiment.
Figure 9:
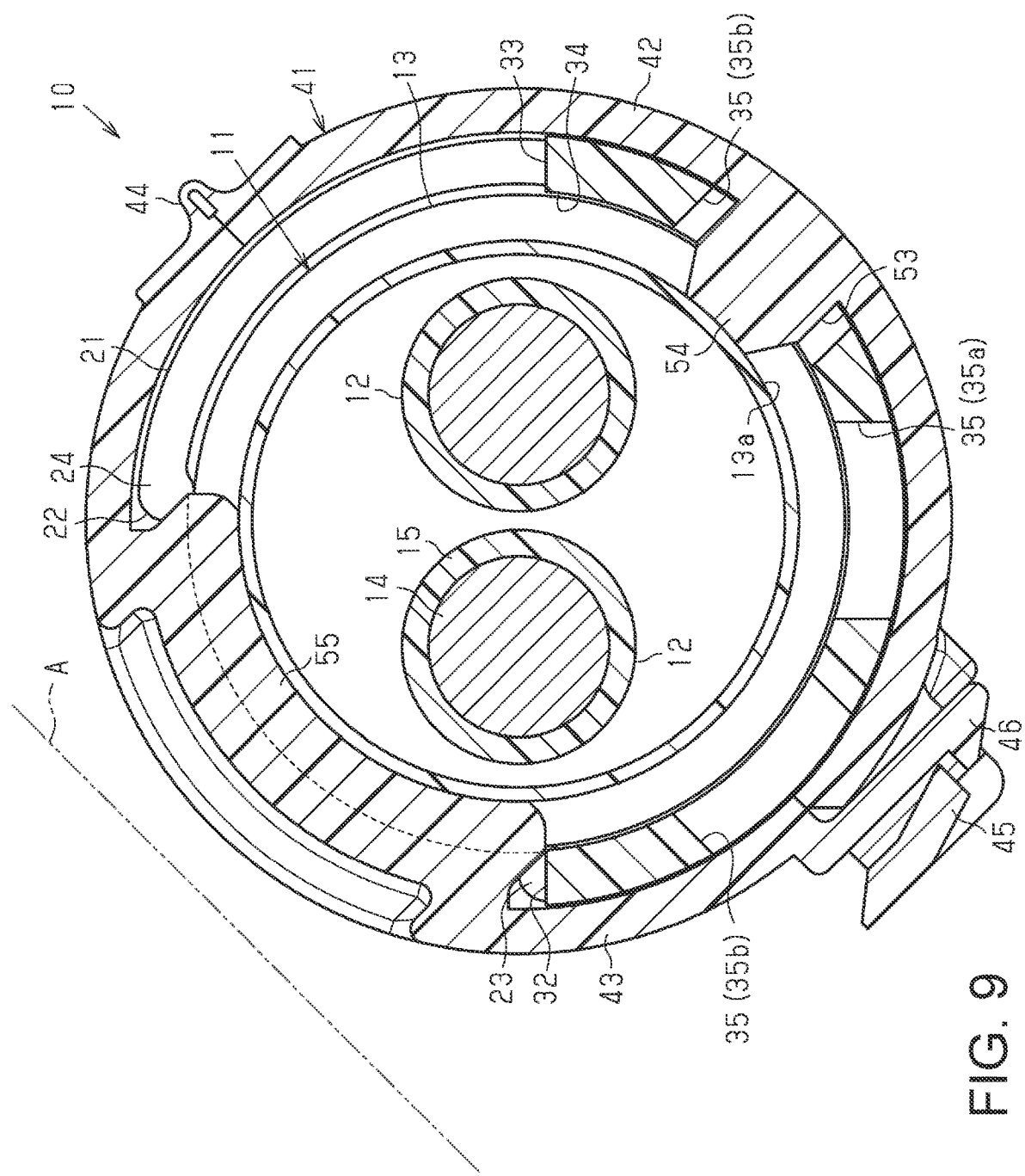
FIG. 9 is a cross-sectional view taken along line 9-9 in FIG. 8.

On the other hand, in the state shown in FIGS. 8 and 9, the third protruding parts 53 are fitted into the through holes 35b. In this state, the opening direction of the first insertion opening 22 of the first path restricting members 21 does not have the same orientation as the opening direction of the second insertion opening 34 of the second path restricting member 31.

In this way, in the present embodiment, the orientation of the connecting members 41 and the first path restricting members 21 in the circumferential direction is changeable, while positioning the first path restricting members 21 in the circumferential direction with respect to the connecting members 41. It is thereby possible to change the orientation of the first path restricting members 21 in the circumferential direction thereof such that the first insertion opening 22 face the assembly surface A side, according to the path along which the wire harness main body 11 bends. As a result, this configuration is able to contribute to improving the degree of freedom in the layout of the wire harness 10.

Effects of the present embodiment will now be described.

(1) The first path restricting members 21 restrict the straight part 11s of the path of the wire harness main body 11. The second path restricting member 31 restricts the bent part 11c of the path of the wire harness main body 11. Also, the first path restricting members 21 are provided to be aligned with the second path restricting member 31 in the lengthwise direction of the wire harness main body 11. The position of the first path restricting members 21 with respect to the second path restricting member 31 is thus adjustable.

The second path restricting member 31 has the through holes 35 serving as recessed parts that are recessed along the radial direction of the exterior member 13. On the other hand, the connecting members 41 have the third protruding parts 53 that fit into the through holes 35. Also, it is possible to firmly connect the connecting members 41 to the second path restricting member 31, due to the third protruding parts 53 fitting into the through holes 35.

The first insertion opening 22 of the first path restricting members 21 is an opening along the lengthwise direction of the first path restricting members 21, and extends over the entire length of the first path restricting members 21. It is possible to attach the first path restricting members 21 to the exterior member 13 through the first insertion openings 22, after performing terminal processing such as attaching a connector to a lengthwise end portion of the wires 12. In this way, the first path restricting members 21 are subsequently attachable, thus enabling the assembly workability of the wire harness 10 to be improved.

(2) The connecting members 41 are provided so as to straddle between the first path restricting members 21 and the second path restricting member 31 in the lengthwise direction of the wire harness main body 11. Also, the connecting members 41 surround the outer periphery of part of the first path restricting members 21 in the lengthwise direction thereof. According to this configuration, the connecting members 41 are able to cover the gap between the first path restricting members 21 and the second path restricting member 31 that are attached to the outer periphery of the exterior member 13.

(3) The connecting members 41 have the first protruding part 51 that protrudes toward the first insertion opening 22 and is positioned within the first insertion opening 22. According to this configuration, the first protruding part 51 of the connecting members 41 can be constituted to be contactable with the first insertion opening 22 of the first path restricting members 21 in the circumferential direction of the first path restricting members 21. The first protruding part 51 of the connecting members 41 thereby restricts rotation of the first path restricting members 21 in the circumferential direction thereof, thus enabling the first path restricting members 21 to be kept from rotating in the circumferential direction.

(4) The connecting members 41 include the main body part 42 and the lid part 43 that is connected to the main body part 42. Also, the connecting members 41 have an annular shape surrounding the outer periphery of the exterior member 13 and the second path restricting member 31, in the state where the main body part 42 and the lid part 43 are connected to each other. According to this configuration, the connecting members 41 is subsequently attachable to the exterior member 13 and the second path restricting member 31, due to the connecting members 41 being divided into the main body part 42 and the lid part 43, while forming the connecting members 41 as an annular shape surrounding the exterior member 13 and the second path restricting member 31. The assembly workability of the wire harness 10 can thereby be even further improved.

(5) The first protruding part 51 is provided on the lid part 43. Also, the lid part 43 is disposed so as to be closer to the assembly surface A than is the main body part 42. According to this configuration, in the connecting members 41, the first protruding part 51 that is positioned within the first insertion opening 22 of the first path restricting members 21 is provided on the lid part 43 which is closer to the assembly surface A of the vehicle body. Also, in the first path restricting members 21, the position of the first insertion opening 22 in the circumferential direction is determined by the first protruding part 51 of the connecting members 41. That is, according to this configuration, the first insertion opening 22 of the first path restricting members 21 can be constituted so as to face toward the lid part 43 of the connecting members 41, that is, toward the assembly surface A of the vehicle body. Accordingly, the first protruding part 51 provided on the lid part 43 is able to keep the first insertion opening 22 of the first path restricting members 21 from facing the opposite side to the assembly surface A of the vehicle body. As a result, the first path restricting members 21 are able to suitably protect the exterior member 13.

(6) The exterior member 13 is a bellows-shaped corrugated tube in which the recessed parts 13a and raised parts 13b are alternately continuous in the lengthwise direction of the exterior member 13. The connecting members 41 have the second protruding parts 52 protruding from the first protruding part 51. The second protruding parts 52 are fitted into the recessed parts 13a of the exterior member 13. According to this configuration, the second protruding parts 52 of the connecting members 41 engage the recessed parts 13a of the exterior member 13 in the lengthwise direction of the exterior member 13. The exterior member 13 can thereby be kept from moving in the lengthwise direction relative to the connecting members 41. Also, in other words, the connecting members 41 are positioned with respect to the exterior member 13 in the lengthwise direction thereof. Accordingly, during the assembly work of the wire harness 10, it is possible to adjust the position of the first path restricting members 21 with respect to the second path restricting member 31, in a state where the position of the connecting members 41 with respect to the exterior member 13 is fixed.

(7) The connecting members 41 have the fourth protruding parts 54 protruding from the third protruding parts 53. Also, the fourth protruding parts 54 are fitted into the recessed parts 13a of the exterior member 13. According to this configuration, the fourth protruding parts 54 of the connecting members 41 engage the recessed parts 13a of the exterior member 13 in the lengthwise direction of the exterior member 13. The exterior member 13 can thereby be kept from moving in the lengthwise direction relative to the connecting members 41. Also, in other words, the connecting members 41 are positioned with respect to the exterior member 13 in the lengthwise direction thereof. Accordingly, during the assembly work of the wire harness 10, it is possible to adjust the position of the first path restricting members 21 with respect to the second path restricting member 31, in a state where the position of the connecting members 41 relative the exterior member 13 is fixed.

(8) The plurality of through holes 35 are provided in the second path restricting member 31 in the circumferential direction thereof. According to this configuration, which of the plurality of through holes 35 provided in the second path restricting member 31 in the circumferential direction thereof are to be fitted together with the third protruding parts 53 of the connecting members 41 is selectable according to the path in the bent part 11c of the wire harness main body 11. The degree of freedom in the layout of the wire harness 10 can thus be improved.

(9) The second path restricting member 31 has the second insertion opening 34 which is an opening along the lengthwise direction of the second path restricting member 31 and extending over the entire length of the second path restricting member 31. It is thereby possible to attach the second path restricting member 31 to the exterior member 13 through the second insertion opening 34, after performing terminal processing such as attaching a connector to a lengthwise end portion of the wires 12. In this way, the second path restricting member 31 is subsequently attachable, thus enabling the assembly workability of the wire harness 10 to be further improved.

Also, the second path restricting member 31 of the present embodiment does not include a lid body that blocks off the second insertion opening 34. In this way, the fact that there is no process for closing a lid body after attaching the second path restricting member 31 to the exterior member 13 is able to contribute to improving the assembly workability of the wire harness 10.

(10) The first path restricting member 21 is provided for each of the two straight parts 11s provided one on either side of the bent part 11c on the path of the wire harness main body 11. Also, the connecting member 41 is provided at both end portions of the second path restricting member 31 in the lengthwise direction of the wire harness main body 11. According to this configuration, the first path restricting members 21 disposed on either side of the second path restricting member 31 in the lengthwise direction of the wire harness main body 11 are provided to be aligned with the second path restricting member 31 in the lengthwise direction of the wire harness main body 11. The position of the first path restricting members 21 with respect to the second path restricting member 31 is thus adjustable.

(11) The first path restricting members 21 have the first end portion 23 and second end portion 24 which are both end portions in the circumferential direction of the first path restricting members 21 and form the first insertion opening 22, and the contact part 26 that protrudes from the inner surface of both the first end portion 23 and the second end portion 24 and contacts the outer surface of the exterior member 13. The first path restricting members 21 can thus be suitably kept from detaching from the exterior member 13 through the first insertion opening 22. Accordingly, the first path restricting members 21 are provisionally fixed to the outer periphery of the exterior member 13 by the contact parts 26 provided thereto, and thus workability at the time of inserting the first protruding part 51 of the connecting members 41 into the first insertion opening 22 of the first path restricting members 21 that are provisionally fixed to the exterior member 13 is improved. As a result, the assembly workability of the wire harness 10 can be further improved.

(12) The contact part 26 protrudes from the inner surface of both the distal end 23*a* of the first end portion 23 and the distal end 24*a* of the second end portion 24. According to this configuration, the first path restricting members 21 can be better kept from detaching from the exterior member 13 through the first insertion opening 22, compared to the case where the contact part 26 protrudes from the inner surface at a position slightly away from the distal end 23*a* of the first end portion 23 and the distal end 24*a* of the second end portion 24, for example.

(13) The distal end 23*a* of the first end portion 23 and the distal end 24*a* of the second end portion 24 are both curved, as seen from the lengthwise direction of the first path restricting members 21. The exterior member 13 can thus be smoothly inserted inside the first path restricting members 21 through the first insertion opening 22 that is formed by the distal ends 23*a* and 24*a*. Also, the exterior member 13 is less likely to be damaged, when inserting the exterior member 13 inside the first path restricting members 21 through the first insertion opening 22.

(14) The cross-sectional shape of the first path restricting members 21 is the same over the entire length of the first path restricting members 21. According to this configuration, the first path restricting members 21 can be easily manufactured, by using an extruder that extrudes the raw material of the first path restricting members 21 in the lengthwise direction. Also, a plurality of types of first path restricting members 21 having different lengthwise dimensions can be manufactured using a single extruder.

(15) The contact parts 26 extend over the entire length of the first path restricting members 21. According to this configuration, the bending rigidity of the first path restricting members 21 can be enhanced. Also, the contact parts 26 contact the outer surface of the exterior member 13 over the entire length of the first path restricting members 21. The first path restricting members 21 can thus be kept from detaching the exterior member 13 through the first insertion opening 22 over the entire length of the first path restricting members 21.

The present embodiment can be implemented in a changed manner as follows. The present embodiment and the following example changes can be implemented in combination with each other to the extent that there no technical inconsistencies.

In each through hole group 35G, the disposition and number of through holes 35 are not limited to the above embodiment, and can be changed as appropriate. For example, in each through hole group 35G of the above embodiment, the number of rows of through holes 35 in the lengthwise direction of the second path restricting member 31 is two, but the number of rows may be changed to one or to three or more. Also, in each through hole group 35G of the above embodiment, three through holes 35 are provided in the second path restricting member 31 along the circumferential direction thereof, but, alternatively, two through holes or four or more through holes may, for example, be provided along the circumferential direction. Also, the configuration may be changed such that one through hole 35 is provided at either end portion of the second path restricting member 31.

In the above embodiment, the first engaging parts that engagingly fit together with the third protruding parts 53 are the through holes 35 that pass through the second path restricting member 31 in the radial direction, but, alternatively, the first engaging parts may, for example, be recessed parts that do not pass through the second path restricting member 31.

In the above embodiment, the first engaging parts of the second path restricting member 31 are the through holes 35, the second engaging parts of the connecting members 41 are the third protruding parts 53, and the first engaging parts and the second engaging parts fit together engagingly, but the relationship in which these parts fit together engagingly may be reversed. In this case, the second path restricting member 31 has a raised part serving as a first engaging part that protrudes from the outer peripheral surface of the second path restricting member 31. The connecting members 41 have a recessed part serving as a second engaging part that fits together with the raised part. A plurality of recessed parts serving as second engaging parts are provided in the circumferential direction, similarly to the through holes 35 of the above embodiment, for example. Also, the recessed parts serving as the second engaging parts are provided only in the main body part 42 of the connecting members 41, or are provided in both the main body part 42 and the lid part 43. By providing the recessed parts serving as the second engaging parts in both the main body part 42 and the lid part 43, the range over which the orientation of the connecting members 41 and the first path restricting members 21 is changeable in the circumferential direction thereof can be expanded.

In the connecting members 41, the first protruding part 51 and the second protruding parts 52 may be omitted. That is, a configuration may be adopted in which the connecting members 41 do not engage the first path restricting members 21 in the circumferential direction. Also, in the connecting members 41, the fourth protruding parts 54 and the fifth protruding parts 55 may be omitted.

A first circumferential engaging part consisting of a raised part or a recessed part may be provided on the outer peripheral surface of the intermediate portion 25 of the first path restricting members 21, and a second circumferential engaging part that engagingly fits together with the first circumferential engaging part may be provided on the inner peripheral surface of the main body part 42 of the connecting members 41. By then engaging the first circumferential engaging part and the second circumferential engaging part in the circumferential direction of the first path restricting members 21, the first path restricting members 21 may be positioned in the circumferential direction with respect to the connecting members 41.

In the connecting members 41 of the above embodiment, the main body part 42 and the lid part 43 are formed integrally with each other, but the present disclosure is not particularly limited thereto, and the main body part 42 and the lid part 43 may be formed separately.

The contact part 26 of the above embodiment protrudes from the distal end 23a of the first end portion 23, but the present disclosure not limited thereto, and the contact part 26 may be provided at a position further away from the first insertion opening 22 than is the distal end 23a of the first end portion 23, in the circumferential direction of the first path restricting members 21. Also, the contact part 26 of the above embodiment protrudes from the distal end 24a of the second end portion 24, but the present disclosure is not limited thereto, and the contact part 26 may be provided at a position further away from the first insertion opening 22 than is the distal end 24a of the second end portion 24, in the circumferential direction of the first path restricting members 21.

In the first path restricting members 21, the contact parts 26 may be partially provided in the lengthwise direction of the first path restricting members 21.

In the first path restricting members 21, at least one of the contact part 26 of the first end portion 23 and the contact part 26 of the second end portion 24 may be omitted.

In the first path restricting members 21, a second contact part that protrudes from the inner surface of the intermediate portion 25 and contacts the outer surface of the exterior member 13 may be provided. According to this configuration, it is possible for the contact part 26 and the second contact part to both be brought in contact with the outer surface of the exterior member 13, and, as a result, the first path restricting members 21 can be kept from rattling.

In the first path restricting members 21, a groove extending along the lengthwise direction may be provided in the outer peripheral surface of the intermediate portion 25. According to this configuration, it is possible to easily widen the first insertion opening 22, due to the intermediate portion 25 being easily deformed to the outer peripheral side with the groove as the origin. As a result, this configuration is able to contribute to improving the assemblability of the first path restricting members 21.

The first path restricting members 21 may be constituted such that the radial thickness of the intermediate portion 25 changes in the circumferential direction.

The shape of the intermediate portion 25 of the first path restricting members 21 is not limited to being a circular arc shape, and is changeable to an elliptical arc shape, for example. Also, the shape of the inner peripheral surface of the second path restricting member 31 is not limited to a circular arc shape, and is changeable to an elliptical arc shape, for example.

In the above embodiment, in the lengthwise direction of the wire harness main body 11, the first path restricting members 21 are aligned with the second path restricting member 31 via a slight gap. However, the present disclosure is not limited thereto, and the first path restricting members 21 may contact the second path restricting member 31 in the lengthwise direction of the wire harness main body 11.

In the above embodiment, a configuration may be adopted in which a slit along the lengthwise direction to the exterior member 13 and extending over the entire length of the exterior member 13 is provided, and the first path restricting members 21 are fixable in the slit.

The number of second path restricting members 31 provided in the wire harness 10 is determined as appropriate according to the path of the wire harness main body 11, and one or a plurality of second path restricting members 31 are provided.

In the above embodiment, the first path restricting member 21 is provided on both sides of the second path restricting member 31 in the lengthwise direction of the wire harness main body 11, but the first path restricting member 21 may be provided only on one side of the second path restricting member 31 in the lengthwise direction of the wire harness main body 11.

In the above embodiment, the wires 12 are high-voltage electrical wires, but the present disclosure not limited thereto, and the wires 12 may, for example, be low-voltage electrical wires.

The embodiment and example changes disclosed herein should be considered in all respects to be illustrative and not restrictive. The scope of the disclosure is defined by the claims rather than by the foregoing description, and all changes that come within the meaning and range of equivalency of the claims are intended to be embraced therein.

As shown in FIG. 2, the connecting members 41 may have a first recessed part provided in the outer surface of the lid part 43 at a position corresponding to the first protruding part 51 and a second recessed part provided in the outer surface of the lid part 43 at a position corresponding to the fifth protruding parts 55. The widths of the first recessed part along the lengthwise direction of the connecting members 41 and along the circumferential direction of the connecting members 41 may be different from the widths of the second recessed part along the lengthwise direction of the connecting members 41 and along the circumferential direction of the connecting members 41. The orientation of the connecting members 41 can thereby be grasped without looking at the inner surface of the connecting members 41.

As shown in FIG. 6, the distal end 23a of the first end portion 23 and the distal end 24a of the second end portion 24 of the first path restricting members 21 may respectively oppose both circumferential end portions of the first protruding part 51. A circumferential gap may be formed between the first end portion 23 and the first protruding part 51 and between the second end portion 24 and the first protruding part 51, in a state where the first path restricting members 21 are held in the connecting members 41.

As shown in FIG. 7, a circumferential gap may be formed between the through holes 35 of the second path restricting member 31 and the third protruding parts 53. This gap may be smaller than the circumferential gap between the third end portion 32 of the second path restricting member 31 and the fifth protruding parts 55 and the circumferential gap between the fourth end portion 33 and the fifth protruding parts 55. As shown in FIG. 5, a gap in the lengthwise direction of the second path restricting member 31 may be formed between the through holes 35 and the third protruding parts 53.

As shown in FIG. 6, the surface of the distal end 23a of the first end portion 23 may be a circular arc shape smoothly continuous with the surface of the contact part 26 of the first end portion 23, as seen from the lengthwise direction of the first path restricting members 21. In other words, the distal end 23a and contact part 26 of the first end portion 23 may have circular arc-shaped surfaces that extend on the same circumference, as seen from the lengthwise direction of the first path restricting members 21. Similarly, the surface of the distal end 24a of the second end portion 24 may be a circular arc shape smoothly continuous with the surface of the contact part 26 of the second end portion 24. In other words, the distal end 24a and contact part 26 of the second end portion 24 may have circular arc-shaped surfaces that extend on the same circumference, as seen from the lengthwise direction of the first path restricting members 21. Note that the first end portion 23 may be referred to as a first edge portion, and the second end portion 24 may be referred to as a second edge portion. Also, one of the pair of contact parts 26 may be referred to as a first contact part, and the other of the pair of contact parts 26 may be referred to as a second contact part.

As shown in FIG. 2, the first insertion opening 22 may be a first groove along the lengthwise direction of the first path restricting members 21 and extending linearly over the entire length of the first path restricting members 21, and the first groove may be open at both ends in the lengthwise direction of the first path restricting members 21. As shown in FIGS. 2 and 6, the entire first insertion opening 22 may face the side on which the assembly surface A is provided, which is, for example, the opposite side to the ground, in a state where the first path restricting members 21 are held by the connecting members 41. The first path restricting members 21 may be referred to as first path regulating members that regulate the path of the straight parts 11s of the wire harness main body 11.

As shown in FIG. 2, the second insertion opening 34 may be a second groove that bends along the lengthwise direction of the second path restricting member 31, and the second groove may be open at both ends in the lengthwise direction of the second path restricting member 31. As shown in FIGS. 2 and 7, the entire second insertion opening 34 may face the side on which the assembly surface A is provided, which is, for example, the opposite side to the ground, in a state where the second path restricting member 31 is held by the connecting members 41. The second path restricting member 31 may be referred to as a second path regulating member that regulates the path of the bent part 11c of the wire harness main body 11.

As shown in FIG. 6, the first protruding part 51 may protrude from the lid part 43 on the opposite side to the assembly surface A. As shown in FIG. 7, the third protruding parts 53 may protrude from the main body part 42 toward the assembly surface A. The fifth protruding parts 55 may protrude from the lid part 43 on the opposite side to the assembly surface A. The fifth protruding parts 55 may be provided at a position on the inner peripheral surface of the lid part 43 so as to sandwich the center of the exterior member 13 together with the third protruding parts 53.

As shown in FIG. 5, the plurality of second protruding parts 52 may be provided at an interval equal to the interval (pitch) at which the recessed parts 13a are provided, in the lengthwise direction of the first path restricting members 21. The width of the second raised part 52 along the lengthwise direction thereof may be smaller than the width of the recessed parts 13a, that is, the interval between adjacent raised parts 13b.

As shown in FIG. 5, the connecting members 41 may have a plurality of fourth protruding parts 54 and a plurality of fifth protruding parts 55 that are disposed at intervals in the lengthwise direction of the second path restricting member 31. The fourth protruding parts 54 may be provided at an interval that is an integer multiple of the interval at which the recessed parts 13a are provided, in the lengthwise direction of the second path restricting member 31, and the fifth protruding parts 55 may be provided at an interval that is an integer multiple of the interval at which the recessed parts 13a are provided, in the lengthwise direction of the second path restricting member 31. The width of the fourth protruding parts 54 and fifth protruding parts along the lengthwise direction thereof may be smaller than the width of the recessed parts 13a, that is, the interval between adjacent raised parts 13b.

The present disclosure encompasses the following implementation examples. The reference numerals of a number of constituent elements of the exemplary embodiments have been added as an aid to understanding rather than for limitation purposes. Some of the matters described in the following implementation examples may be omitted, and some of the matters described in the implementation examples may be selected or extracted and combined.

Supplementary Note 1

In one mode of the present disclosure, the connecting member (41) may have a first recessed part provided on the outer surface of the lid part (43) at a position corresponding to the first protruding part (51), and a second recessed part provided on the outer surface of the lid part (43) at a position corresponding to the fifth protruding parts (55), and the widths of the first recessed part along the lengthwise direction of the connecting member (41) and along the circumferential direction of the connecting member (41) may respectively be different from the widths of the second recessed part along the lengthwise direction of the connecting member (41) and along the circumferential direction of the connecting member (41).

Supplementary Note 2

In one mode of the present disclosure, the contact part (26) may protrude from the inner surface of both of the distal end of the first end portion (23) and the distal end of the second end portion (24), and as seen from the lengthwise direction of the first path restricting member (21), the surface of the distal end (23a) of the first end portion (23) may be a circular arc shape smoothly continuous with the surface of the contact part (26), and the surface of the distal end (24a) of the second end portion (24) may be a circular arc shape smoothly continuous with the surface of the contact part (26).

Supplementary Note 3

In one mode of the present disclosure, the fifth protruding parts (55) may be provided at a position on the inner peripheral surface of the lid part (43) so as to sandwich the center of the exterior member (13) together with the third protruding parts (53).

The invention claimed is:

1. A wire harness to be attached to a vehicle body, the wire harness comprising:
   a wire harness main body having an electrical wire and an exterior tube covering the electrical wire;
   a first path restrictor attached to an outer periphery of the exterior tube and restricting a path of a straight part which is a portion of a path of the wire harness main body that is straight;
   a second path restrictor attached to the outer periphery of the exterior tube and restricting a path of a bent part which is a portion of the path of the wire harness main body that bends; and
   a connector having an annular shape surrounding the outer periphery of the exterior tube and an outer periphery of the second path restrictor, and connecting the exterior tube and the second path restrictor to each other, wherein:
      the second path restrictor has a first engaging part which is a raised part protruding along a radial direction of the exterior tube or a recessed part recessed along the radial direction of the exterior tube,
      the connector has a second engaging part engagingly fitting together with the first engaging part,
      the first path restrictor has an insertion opening which is an opening along a lengthwise direction of the first path restrictor and extending over an entire length of the first path restrictor, and the first path restrictor is provided to be aligned with the second path restrictor in a lengthwise direction of the wire harness main body.

2. The wire harness according to claim 1, wherein:
the connector is provided so as to straddle between the first path restrictor and the second path restrictor in the lengthwise direction of the wire harness main body, and
the connector surrounds an outer periphery of part of the first path restrictor in the lengthwise direction of the first path restrictor.

3. The wire harness according to claim 2,
wherein the connector has a protrusion protruding toward the insertion opening and positioned within the insertion opening.

4. The wire harness according to claim 1, wherein:
the connector has a main body and a lid that is connected to the main body, and
the connector has an annular shape surrounding the outer periphery of the exterior tube and the outer periphery of the second path restrictor, in a state where the main body and the lid are connected.

5. The wire harness according to claim 4, wherein:
the vehicle body has an assembly surface to which the wire harness main body is to be assembled,
the lid is disposed so as to be closer to the assembly surface than is the main body, and
the protrusion is provided in the lid.

6. The wire harness according to claim 3, wherein:
the exterior tube is a bellows-shaped corrugated tube in which a recessed part and a raised part are alternately continuous in the lengthwise direction of the exterior tube,
the protrusion is a first protrusion, and the connector has a second protrusion protruding from the first protrusion, and
the second protrusion is fitted into the recessed part of the corrugated tube.

7. The wire harness according to claim 1, wherein:
the exterior tube is a bellows-shaped corrugated tube in which a recessed part and a raised part are alternately continuous in the lengthwise direction of the exterior tube,
the first engaging part is a through hole formed along the radial direction of the exterior tube,
the second engaging part is a third protrusion fitting into the through hole,
the connector is a fourth protrusion protruding from the third protrusion, and
the fourth protrusion is fitted into the recessed part of the corrugated tube.

8. The wire harness according to claim 1,
wherein the first engaging part is a plurality of the first engaging parts provided in a circumferential direction of the second path restrictor.

9. The wire harness according to claim 1, wherein:
the insertion opening of the first path restrictor is a first insertion opening,
the second path restrictor has a second insertion opening which is an opening along a lengthwise direction of the second path restrictor and extending over an entire length of the second path restrictor.

10. The wire harness according to claim 1, wherein:
the first path restrictor is provided for each of a pair of straight parts provided one on either side of the bent part on the path of the wire harness main body, and
the connector is provided at both ends of the second path restrictor in the lengthwise direction of the wire harness main body.

11. The wire harness according to claim 1, wherein:
the first path restrictor has:
 a first end and a second end which are both ends in a circumferential direction of the first path restrictor and form the insertion opening; and
 a contact protruding from an inner surface of at least one of the first end and the second end and contacting an outer surface of the exterior tube.

12. The wire harness according to claim 11,
wherein the contact protrudes from an inner surface of a distal end of at least one of the first end and the second end.

* * * * *